UNITED STATES PATENT OFFICE.

HENRY A. GARDNER, OF WASHINGTON, DISTRICT OF COLUMBIA.

FINISH-REMOVER.

1,079,698.           Specification of Letters Patent.     Patented Nov. 25, 1913.

No Drawing.     Application filed September 10, 1913.   Serial No. 789,130.

*To all whom it may concern:*

Be it known that I, HENRY A. GARDNER, a citizen of the United States, residing at Washington, in the District of Columbia, have invented certain new and useful Improvements in Finish-Removers, of which the following is a specification.

In my prior Patent No. 1,067,600, patented July 15, 1913, I have described and claimed a finish remover comprising a polymerized oil, such as linseed oil or Chinese wood oil, and a finish-dissolving liquid in which the polymerized oil is insoluble. As described in said patent, it is desirable to add to the above mixture a substance, of which castor oil is a type, serving to keep the polymerized oil soft. Other softening agents suitable for this purpose are mineral or hydrocarbon oils, or vaseline, and particularly such hydrocarbon oils as consist wholly or in part of compounds of the paraffin series.

The present invention is an improvement on the above, by which the softening agent is brought into much more intimate association with the polymerized oil, or preferably with a portion of this oil, and exerts its softening function to a far higher degree. To this end the softening agent is preferably incorporated with a portion of the oil to be polymerized, and such portion is then subjected to the polymerizing temperature in presence of the softening agent, with the result that the polymerized oil envelops the softening agent, or is otherwise so intimately associated therewith as materially to improve the efficiency of the polymerized oil as an evaporation retarder.

An illustrative example of the present invention is as follows:—25 parts of a suitable mineral, vegetable or animal wax, such as paraffin, carnauba wax, beeswax or the like are dissolved in 75 parts of Chinese wood oil, and the mixture is heated to 280° C., for five to eight minutes, or for a somewhat longer period at a somewhat lower temperature. Under these conditions, polymerization of the wood oil sets in, and the oil and wax mixture is converted into a thick, viscous, somewhat gelatinous mass, markedly different from the product obtained by subjecting wood oil unmixed with wax to the same temperature conditions. The wax is intimately associated with and enveloped by the oil and serves to prevent the oil from becoming too dry or hard. It may also limit to some degree the extent to which the polymerization proceeds, with the result that a portion of the oil and wax may appear in solution in the finish remover. Proportions other than those specified above as illustrative may of course be used.

A finish remover in accordance with this invention may comprise for example:

| | |
|---|---|
| Polymerized oil | 10 parts. |
| Polymerized oil-wax composition | 10 " |
| Benzol | 40 " |
| Acetone | 20 " |
| Wood alcohol | 20 " |

The above proportions are merely illustrative and may be considerably varied according to the nature of the surface to which the finish remover is to be applied. A finish remover compounded as above exhibits a high degree of adhesiveness when applied to paint or similar surfaces and is well adapted for use on vertical surfaces.

In some cases the whole of the oil which is to enter into the composition may be subjected to the polymerizing temperature in presence of the wax softener, but in general it is preferred that the finish remover should contain, as in the above example, not only oil which has been polymerized in presence of the wax, but also oil which has been polymerized by itself.

Carbon tetrachlorid may be added if desired for the purpose of rendering the finish remover non-inflammable or less readily inflammable.

The mode of use of the improved finish remover may be as described in my prior patent above referred to.

I claim:—

1. A finish remover comprising polymerized oil, a waxy body intimately associated therewith, and a finish-dissolving liquid in which polymerized oil is insoluble.

2. A finish remover comprising polymerized oil, a finish-dissolving liquid in which polymerized oil is insoluble, and a softening agent consisting of polymerized oil intimately associated with a waxy body.

3. A softening agent for finish removers, consisting of a polymerized oil intimately associated with a waxy body.

4. In a process of making a finish remover, the step of preparing a softening agent, which consists in mixing a waxy body with a suitable oil, and polymerizing said oil.

In testimony whereof I affix my signature in presence of two witnesses.

HENRY A. GARDNER.

Witnesses:
C. P. TOWNSEND,
N. P. LEONARD.

---

Copies of this patent may be obtained for five cents each, by addressing the "Commissioner of Patents, Washington, D. C."